United States Patent
Brown et al.

(10) Patent No.: US 11,855,727 B2
(45) Date of Patent: *Dec. 26, 2023

(54) TRANSFORM DOMAIN CHANNEL STATE INFORMATION FEEDBACK

(71) Applicant: Lenovo (Singapore) Pte. Ltd., New Tech Park (SG)

(72) Inventors: Tyler Brown, Lake Zurich, IL (US); Udar Mittal, Rolling Meadows, IL (US); Ahmed Hindy, Forest Park, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,386

(22) Filed: Apr. 26, 2022

(65) Prior Publication Data

US 2022/0255606 A1    Aug. 11, 2022

Related U.S. Application Data

(63) Continuation of application No. 16/671,039, filed on Oct. 31, 2019, now Pat. No. 11,316,571.

(60) Provisional application No. 62/754,460, filed on Nov. 1, 2018.

(51) Int. Cl.
*H04B 7/06* (2006.01)
*H04L 27/26* (2006.01)

(52) U.S. Cl.
CPC ......... *H04B 7/0626* (2013.01); *H04B 7/0634* (2013.01); *H04B 7/0639* (2013.01); *H04L 27/2636* (2013.01)

(58) Field of Classification Search
None
See application file for complete search history.

(56) References Cited

U.S. PATENT DOCUMENTS

2020/0083938 A1* 3/2020 Park ..................... H04B 7/0404

* cited by examiner

*Primary Examiner* — Adnan Baig
(74) *Attorney, Agent, or Firm* — Loppnow & Chapa

(57) ABSTRACT

The generation of a channel state information report is provided. The generation includes transmitting reference signals to a user equipment, and receiving a reported set of quantized weighting coefficients, each of the weighting coefficients corresponding to a respective beam index and a respective tap index, where a set of beams based on the received reference signals is selected, where each of the beams corresponds to a discrete Fourier transform vector, and where each of the beams has a corresponding beam index. The tap index corresponds to a member of a Fourier basis set, where at least two subsets of the reported set of weighting coefficients are quantized according to separate quantization procedures.

20 Claims, 7 Drawing Sheets

TRANSFORM DOMAIN CHANNEL STATE INFORMATION FEEDBACK

FIELD OF THE INVENTION

The present disclosure is directed to a method and apparatus related to channel state information feedback, including the generation of a channel state information report having weighting coefficients which make use of multiple separate quantization procedures.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In an effort to enhance system performance, more recent standards have looked at different forms of spatial diversity including different forms of multiple input multiple output (MIMO) systems, which involve the use of multiple antennas at each of the source and the destination of the wireless communication for multiplying the capacity of the radio link through the use of multipath propagation. Such a system makes increasingly possible the simultaneous transmission and reception of more than one data signal using the same radio channel.

As part of supporting MIMO communications, user equipment can make use of channel state information codebooks, which help to define the nature of the adopted beams, which are used to support a particular data connection. Higher rank codebooks can sometimes be used to enhance system performance, but often at the price of an increase in the amount of feedback overhead.

In at least some wireless communication systems, channel state information (CSI) feedback is used to report on current channel conditions. This can be increasingly useful in frequency division duplexing (FDD) and frequency division multiple access (FDMA) systems where the downlink (DL) and uplink (UL) channels are not reciprocal. With multi-user (MU)-MIMO and spatial multiplexing, a receiving device, such as a user equipment (UE), may need to report channel conditions for multiple channels or beams. Accordingly, much overhead may be dedicated to CSI reporting in MU-MIMO and spatial multiplexing systems.

The present inventors have recognized that improved methods for efficiently coding a channel state information (CSI) codebook may be beneficial, as well as apparatuses and systems that perform the functions of the methods. The present inventors have further recognized that one such method (e.g., of a user equipment) can include communicating with a transmit-receive point (TRP) over a radio access network using spatial multiplexing. Here, multiple transmission layers may be transmitted at a time, each transmission layer comprising multiple beams. The method can include transforming a set of frequency-domain precoding vectors to generate a set of coefficients in a compressed basis. It may be further beneficial for the method to also include quantizing the compressed basis coefficients depending on their index relative to indices of dominant compressed basis coefficients and the beam. Indications of the quantized basis coefficients along with their indices may then be fed back from the UE to the gNodeB (gNB) as precoding matrix information.

SUMMARY

The present application provides a method in a user equipment for generating a channel state information report. The method includes receiving reference signals transmitted from a base station. A set of beams are selected based on the received reference signals, each of the beams corresponding to a discrete Fourier transform vector, wherein each of the beams has a corresponding beam index. A set of quantized weighting coefficients are reported, each of the weighting coefficients corresponding to a respective beam index and a respective tap index. The tap index corresponds to a member of a Fourier basis set. At least two subsets of the reported set of weighting coefficients are quantized according to separate quantization procedures.

According to another possible embodiment, a user equipment in a communication network, which includes one or more base stations, is provided. The user equipment includes a transceiver that receives reference signals transmitted from one of the one or more base stations. The user equipment further includes a controller that selects a set of beams based on the received reference signals. Each of the beams corresponds to a discrete Fourier transform vector, wherein each of the beams has a corresponding beam index. The transceiver further reports to the network a set of quantized weighting coefficients. Each of the weighting coefficients correspond to a respective beam index and a respective tap index. The tap index corresponds to a member of a Fourier basis set, and at least two subsets of the reported set of weighting coefficients are quantized according to separate quantization procedures.

According to a further possible embodiment, a method in a network entity is provided. The method includes transmitting reference signals transmitted to the user equipment, and receiving a reported set of quantized weighting coefficients. Each of the weighting coefficients corresponds to a respective beam index and a respective tap index. A set of beams based on the received reference signals is selected, where each of the beams corresponds to a discrete Fourier transform vector, and where each of the beams has a corresponding beam index. The tap index corresponds to a member of a Fourier basis set. At least two subsets of the reported set of weighting coefficients are quantized according to separate quantization procedures.

According to a still further possible embodiment, a network entity is provided. The network entity includes a controller, and a transceiver, where the transceiver transmits a reference signal transmitted from one of the one or more base stations, and receives a reported set of quantized weighting coefficients, each of the weighting coefficients corresponding to a respective beam index and a respective tap index. A set of beams based on the received reference signals is selected, where each of the beams corresponds to a discrete Fourier transform vector, and where each of the beams has a corresponding beam index. The tap index corresponds to a member of a Fourier basis set, and at least two subsets of the reported set of weighting coefficients are quantized according to separate quantization procedures.

These and other features, and advantages of the present application are evident from the following description of one or more preferred embodiments, with reference to the accompanying drawings.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE PREFERRED EMBODIMENT(S)

Figure 1:
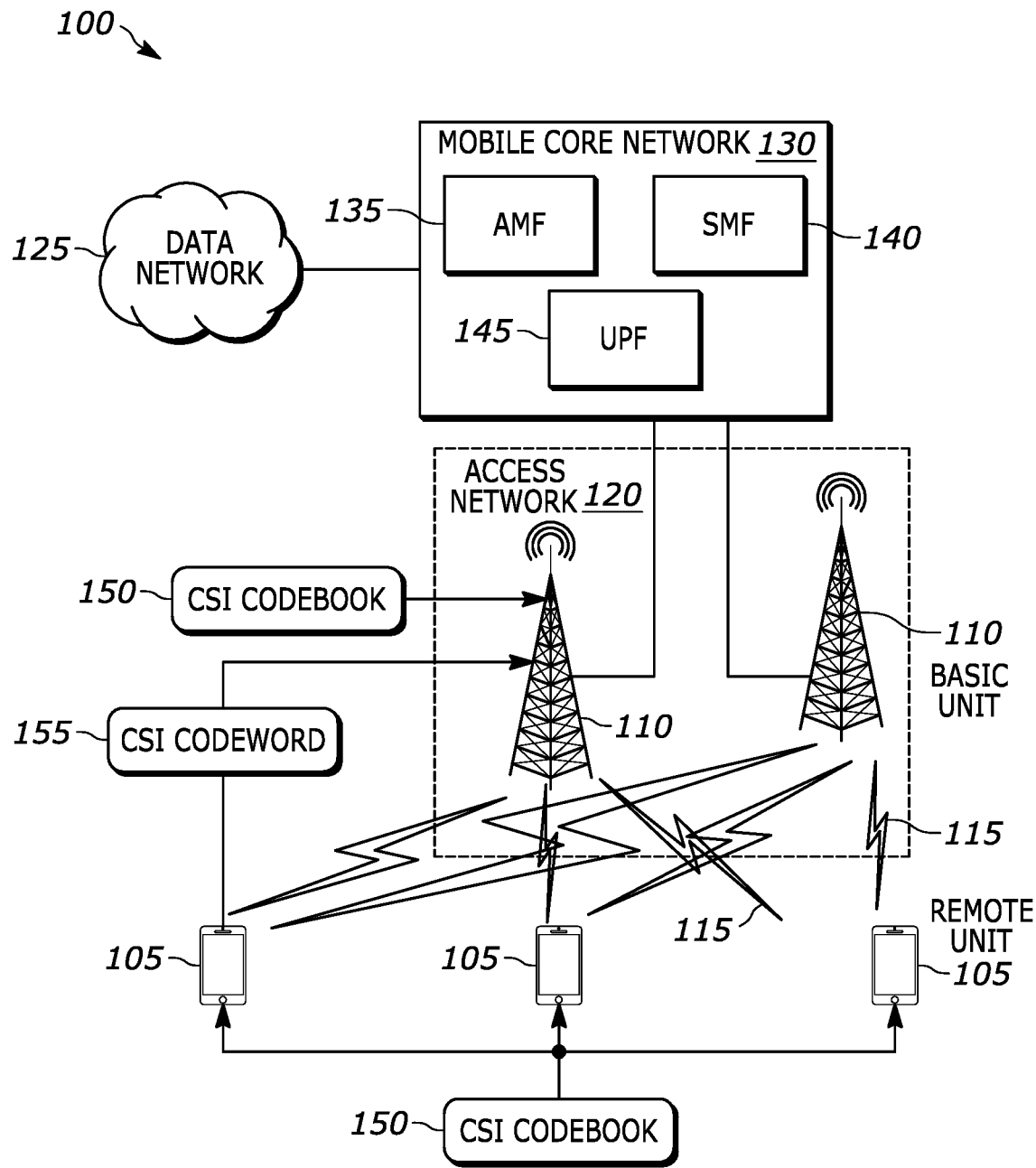
FIG. 1 is a schematic block diagram illustrating one embodiment of a wireless communication system for efficiently coding a CSI codebook and preparing a codeword therefrom.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for generation of a channel state information report having weighting coefficients.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

A number of techniques have been proposed both in new radio (NR) Release 15 and Release 16 for reducing the feedback overhead. At least one such proposed technique involves only sending every other sub-band worth of precoding information and let the gNB use interpolation to obtain precoding information in every other sub-band. Alternatively, sub-band sizes can be made larger.

There have also been a number of proposals which transform the set of precoding vectors in the frequency domain to a compressed domain through a linear transformation. Due to the nature of the wireless channel, essentially its sparseness in the time domain, most of the energy in the compressed domain is concentrated in a small number of coefficients (on the order of 10 to 20 vs. 400 for frequency domain precoding feedback in 10 MHz and 52 RBs). Only this small number of coefficients are fed back. Currently the linear transformations that have been proposed include one derived from the singular value decomposition (SVD) of the matrix formed from the frequency-domain precoding vectors and an oversampled discrete Fourier transform (DFT) transformation. Once the gNB receives the fed back compressed-domain coefficients, the inverse of the linear transformation is applied to give an approximation of the original frequency-domain precoding vectors.

Simulations of schemes based on DFT transformations show promise where overhead reduction of 50% may be possible thereby providing user packet throughput and cell edge performance within a few percent of Release 15 Type II performance. At least one aspect to reducing the overhead may involve addressing the structure of coefficients in the time domain to choose a more optimal set of coefficients to feed back and also taking advantage of this structure to assign different levels of quantization to different weighting coefficients.

In spatial multiplexing, the present inventors have observed that most of the transmitted energy, e.g., 75% or more, is in the main beam of each transmission layer and that in about 85% of cases none of the selected beam vectors have zero amplitudes. The disclosed embodiments leverage this information to improve coding efficiency of codebook parameters for CSI feedback using a Type II codebook. Type II codebooks can provide high resolution information about current channel conditions and can be used in multi-user MIMO ("MU-MIMO") scenarios, where spatial multiplexing is used to increase the number of users and/or to increase the transmission throughput (e.g., data bandwidth) for the users. In various embodiments, a transmitter will transmit a beamformed CSI-specific reference signal (CSI-RS) which the receiver uses to measure channel conditions. Generally, beamformed signals can include a main beam and one or more remaining beams.

FIG. 1 depicts a wireless communication system 100 for efficiently coding a CSI codebook 150, according to embodiments of the disclosure. In one embodiment, the wireless communication system 100 includes at least one remote unit 105, an access network 120 containing at least one base unit 110, wireless communication links 115, and a mobile core network 130. Even though a specific number of remote units 105, access networks 120, base units 110, wireless communication links 115, and mobile core networks 130 are depicted in FIG. 1, one of skill in the art will recognize that any number of remote units 105, access networks 120, base units 110, wireless communication links 115, and mobile core networks 130 may be included in the wireless communication system 100. In another embodiment, the access network 120 contains one or more wireless local area network (WLAN) (e.g., Wi-Fi™) access points.

In one implementation, the wireless communication system 100 is compliant with the 5G system specified in the 3rd generation partnership project (3GPP) specifications (e.g., "5G NR"). More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants (PDAs), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink (UL) and downlink (DL) communication signals. Furthermore, the UL and DL communication signals may be carried over the wireless communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network (RAN), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 130 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink (DL) communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 130 is a 5G core (5GC) or the evolved packet core (EPC), which may be coupled to other data network 125, like the Internet and private data networks, among other data networks. Each mobile core network 130 belongs to a single public land mobile network (PLMN). The present disclosure is not intended to be limited to the implementation of any particular wireless communication system architecture or protocol.

The mobile core network 130 includes several network functions (NFs). As depicted, the mobile core network 130 includes an access and mobility management function (AMF) 135, a session management function (SMF) 140, and a user plane function (UPF) 145. Although a specific number of AMFs 135, SMFs 140, and UPFs 145 are depicted in FIG. 1, one of skill in the art will recognize that any number and type of network function may be included in the mobile core network 130.

The AMF 135 provides services such as UE registration, UE connection management, and UE mobility management. The SMF 140 manages the data sessions of the remote units 105, such as a protocol data unit (PDU) session. The UPF 145 provides user plane (e.g., data) services to the remote units 105. A data connection between the remote unit 105 and a data network 125 is managed by a UPF 145.

To support spatial multiplexing and MU-MIMO, the remote unit 105 provides CSI feedback to the base unit 110 using a Type II codebook. As discussed above, the remote unit 105 selects a codeword 155 from the CSI codebook 150. Here, the access network 120 and the remote units 105 all have copies of the same CSI codebook 150, wherein the remote unit 105 provides CSI feedback by transmitting a codeword 155 from the CSI codebook 150.

Consider an orthogonal frequency division multiplexing (OFDM) system where the number of antenna ports is 2 $N_1 \times N_2$, where the quantities, $N_1$, $N_2$ denote the number of dual-polarized antenna elements in two dimensions respectively. The factor of 2 accounts for the antenna array being composed of two antenna elements, each sensitive to orthogonal polarization (e.g. horizontal and vertical). The received signal at the $N_r$ antennas of the UE can be represented as $$y_n = H_n W_n x_n$$

where $H_n$ is the $N_r \times 2 N_1 N_2$ baseband channel between the gNB and the UE, $W_n$ is the precoding matrix applied at the gNB, and $W_n$ is a R×1 vector of modulation symbols where R is the number of layers to be transmitted. The subscript n denotes a subcarrier or sub-band index. In LTE Release 10-15 as well as in NR systems, the precoding matrix $W_n$ is the product of two matrices $W_n = W_1 W_{2,n}$ where the first precoding matrix $W_1$ is independent of frequency and has the form $$W_1 = \begin{bmatrix} B & 0 \\ 0 & B \end{bmatrix}$$

where B is a $N_1 N_2 \times L$ matrix with L orthogonal columns. The columns of $W_1$ corresponds to 2 L "beams". This term comes from one choice of B where its columns are an orthogonal subset of the oversampled DFT vectors and therefore spatial beams are overlapping in spatial frequency, each with a spatial direction of maximum response. The block diagonal structure of $W_1$ is due to the use of dual polarization with both polarizations having the same set of beams. The B matrix can be the identity matrix in which case L is equal to $N_1 N_2$. The matrix 2 L×R matrix $W_2$, provides frequency-dependent precoding of the R layers of $x_n$ where the precoding is applied to the 2 L beams. Each column of $W_2$, is an 2 L×1 frequency-dependent vector which precodes one layer of information symbols, i.e. one element of $x_n$ In a closed-loop precoding system the measurement of reference signals transmitted by the gNb enables the UE to estimate the channel matrix $H_n$ over a set of frequencies. For example, when reference signals are sent in each of 12 subcarrier-wide resource blocks (RBs), the channel matrix at index n represents the channel in the nth RB. The UE then uses this information to determine W (equivalently B) as well $W_{2,n}$ which in some sense better optimizes the transmission from the gNb. The UE may feed back an indication of the L DFT vectors in B out of a collection of orthogonal beam sets.

The UE may also feed back an indication of the precoding vectors in $W_{2,n}$, one for each layer over a set of, for example RBs spanning the frequency band of operation. The columns of the frequency-dependent precoding matrix $W_{2,n} = [W_{2,n,1}\ W_{2,n,2} \ldots W_{2,n,R}]$ can also be expressed as the product of a frequency-independent component, $W_{2,0,r}$ and a frequency dependent term $W'_{2,n,r}$ $$W_{2,n,r} = W_{2,0,r} \odot W'_{2,n,r}$$

where the symbol ⊚ denote the Schur (also referred to as Hadamard) product which is the element-by-element of two matrices. This allows a "wideband" gain term, $W_{2,0,r}$, to be signaled separately from the term, $W'_{2,n,r}$, which captures the frequency dependent variation. The components of the vector $W_{2,n,r}$ may also be scaled by the strongest element corresponding to a strongest spatial beam. An index from 1 to L indicating the wideband strongest beam can also signaled by the UE. One wideband strongest beam per layer may be signaled.

The frequency-dependent $W_{2,n,r}$ typically contains phase information that instructs the gNb of the relative phase between beams to use when transmitting to the UE. Because an indication of $W'_{2,n,r}$ must be sent for every sub-band, the overhead due to these indications can become larger especially when the bandwidth of operation is large.

The elements of a precoding vector $W_{2,n,r}$ are typically correlated in the sense that their phase typically follows a roughly linear trajectory at least for channels typically used in wireless networks. Mathematically, denoting $W'_{2,n,r}(l)$ $1 \leq l \leq 2$ L as the lth element of the precoding vector for layer r at sub-band n, the phases of the sequence $W_{2,1,r}(l)$, $W_{2,2,r}(l), \ldots, W_{2,N,r}(l)$ typically have a linear trend. This correlation can be attributed to the channel between gNB and UE being linear-shift invariant with a set of dominant taps. For example perfect linear phase across frequency occurs when the channel model contains a single delay tap. The high degree of correlation suggests that a vector of precoding weights across sub-bands $W_{2,r}(l)=[W_{2,1,r}(l), W_{2,2,r}(l), \ldots, W_{2,N_{sb},r}(l)]^T$ can be expressed as a linear combination of a small number of vectors chosen from an orthogonal basis, termed the compressed basis below. Taking the example of the single delay tap channel, the complex channel coefficient along with the delay of the tap is sufficient to specify the precoding vector $W_{2,r}(l)$. In this case the compressed basis is the DFT basis and the single tap coefficient can be obtained with an inverse Fourier transform of $W_{2,r}(l)$. Other orthogonal bases are possible including one derived by the SVD of the correlation matrix of $W_{2,r}(l)$ $[w_{2,1,r}(l), w_{2,2,r}(l), \ldots, w_{2,N_{sb},r}(l)]^T$ taken over beams and possibly ranks.

Instead of reporting an indication of $W_{2,n}$ for all subbands n, the UE first applies a linear transformation denoted by the matrix V to its component length $N_{sb}$ vectors. The transformation is applied to $W_{2,r}(l)$ for each of 2 L beams and each of R layers, forming the transformed vectors $w_{2,r}(l)$:

$$w_{2,r}(l) = V W_{2,r}(l), \ 1 \leq l \leq 2L, \ 1 \leq r \leq R$$

The transformation V can either be known ahead of time by the UE and gNB, e.g. defined in a standard, or in the case of the SVD method mentioned above, signaled by the UE to the gNB.

As mentioned above, most of the energy in the vector $w_{2,r}(l)$ is concentrated in a small number of elements. Instead of feeding back all of the $N_{sb}$ elements of the vector $w_{2,r}(l)$ it is possible to only feed back the elements of $w_{2,r}(l)$ which have significant energy. With this approach it is also beneficial for the UE to send to the gNB the set of indices of the basis functions whose coefficients contain significant energy. Mathematically, this can be described as the UE feeding back an indication of an approximate version of $w_{2,r}(l)$, denoted $\hat{w}_{2,r}(l)$ where all but $K_r(l)$ of the indices of $\hat{w}_{2,r}(l)$ are zero and the corresponding indices, $k_{r,m}(l)$, $1 \leq m \leq K_r(l)$. This indication requires less overhead than that of either the full frequency-domain vectors $W_{2,r}(l)$ or the complete transformed vectors $w_{2,r}(l)$. Additional methods of determining approximate weight vectors $\hat{w}_{2,r}(l)$ from the transformed precoding vectors, $w_{2,r}(l)$, will be described below.

Once the gNB receives the indications of $k_{r,m}(l)$ and $\hat{w}_{2,r}(l)$, the gNB can construct $\hat{w}_{2,r}(l)$ and through the inverse transformation $V^{-1}$, an approximation $\hat{W}_{2,r}(l)$ to the precoding vectors $W_{2,r}(l)$ for each beam l and for each layer r:

$$\hat{W}_{2,r} = V^{-1} \hat{w}_{2,r}(l), \ 1 \leq l \leq 2L, \ 1 \leq r \leq R$$

An approximate frequency-dependent precoding matrix, $\hat{W}_{2,n,r}$ can then be formed from the columns $\hat{W}_{2,r}(l)$. As stated above, the gNB also obtains the indication of the beams which define the matrix B which in term form $W_1$. From $W_1$ and $\hat{W}_{2,n,r}$, the gNB can then obtain the complete precoder recommended by the UE:

$$\hat{W} = W_1 \hat{W}_2$$

In one embodiment the transformation, V, to the compressed basis set is the inverse DFT. In this cases the indication of the basis functions are delay values which are represented as integer multiples of a fundamental sampling time. The weights to be fed back are the complex-valued gains of the taps corresponding to these delays.

In one embodiment the precoding vectors in the frequency domain can be normalized by that of a single dominant beam. In this case the transformation is applied to a normalized version of the frequency domain precoding vectors, $\tilde{W}_{2,r}(l)$:

$$\tilde{W}_{2,r}(l) = \frac{W_{2,r}(l)}{W_{2,r}(1)}$$

where here it is assumed that the dominant beam has index '1'. The dominant beam may be different for different ranks. When this is performed, the elements of the precoding vector corresponding to the first beam are unity across frequency and there is no need to transform this vector to the compressed domain since it is known to be unity in the frequency domain. When the compressed domain is the time domain, this normalization has the additional effect of shifting the delays of non-dominant beams. For example if the dominant beam consists of a single delay in the time domain, then normalization by this beam in the frequency domain will cause the delays of all other beams to be shifted such that a delay of zero is the delay of the dominant path.

In addition to forming an approximation, $\hat{w}_{2,r}(l)$, of the transformed precoding vectors $w_{2,r}(l)$ by setting components of $\hat{w}_{2,r}(l)$ equal to the corresponding components of $w_{2,r}(l)$ for those components who have significant energy, i.e., those components which have absolute value above a threshold, other methods of forming approximations to $w_{2,r}(l)$ are possible. In the following an embodiment is described where the transformation, V, which transforms the precoding vectors from the frequency domain to the compressed basis, can be derived from an oversampled DFT matrix by selecting an orthogonal set of columns. Therefore the matrix V is of the form $$V_{m,n} = e^{j\frac{2\pi(m_0+Om)n}{ON_{sb}}}, \ 0 \le m \le N_{sb}-1, \ 0 \le n \le N_{s,b}-1$$

where O is the oversampling factor and $m_0$, $0 \le m_0 < O-1$ is the sampling offset. The same techniques described below can be applied with other choices of transformation. In this embodiment an indication of the sampling offset $m_0$ is also fed back to the gNB along with the indications of the weighting coefficients $\hat{w}_{2,r}(l)$ and corresponding indices of the basis functions, $k_{r,m}(l)$, which in the case of the DFT linear transformation are termed taps.

The transformed vector can be expressed in terms of its components as $$w_{2,r}(l) = [w_{2,1,r}(l), w_{2,2,r}(l), \ldots, w_{2,N_{sb},r}(l)]^T$$

where l is the beam index and r is the layer index. Typical magnitude square of $w_{2,n,r}(l)$ are plotted in FIG. 2 for a fixed layer r and different beams in the vertical direction and tap index n along the horizontal direction. For a fixed beam one or more dominant taps 201 are present where $|w_{2,n,r}(l)|^2$ is relatively large. The adjacent taps 203 have smaller $|w_{2,n,r}(l)|^2$ than that of the dominant tap but still larger than taps further away from the dominant tap. It may be beneficial to feed back weighting coefficients only for those taps with significant energy, which from the figure are the taps whose indices are within a window of a dominant tap. In addition it may be beneficial to quantize the taps with finer quantization (more quantization levels) for larger transformed precoding coefficient magnitude $|w_{2,n,r}(l)|^2$ and fewer quantization levels for taps with low transformed precoding coefficient magnitude $|w_{2,n,r}(l)|^2$. In addition to taps being weaker the farther away from a dominant path, some paths are statistically weaker than others. For example, if the scaling strategy above is employed, then the strongest beam is used as a reference and weighting coefficients are fed back for the remaining 2 L–1 beams beginning with beam 2. In dual-polarized systems, the beam with the same DFT column as the dominant beam, but the orthogonal polarization, tends to be larger than the remaining 2 L–1 beams. Therefore the number of quantization levels used for a beam can be based on the proximity of a tap to a dominant tap as well as its beam index.

Figure 2:
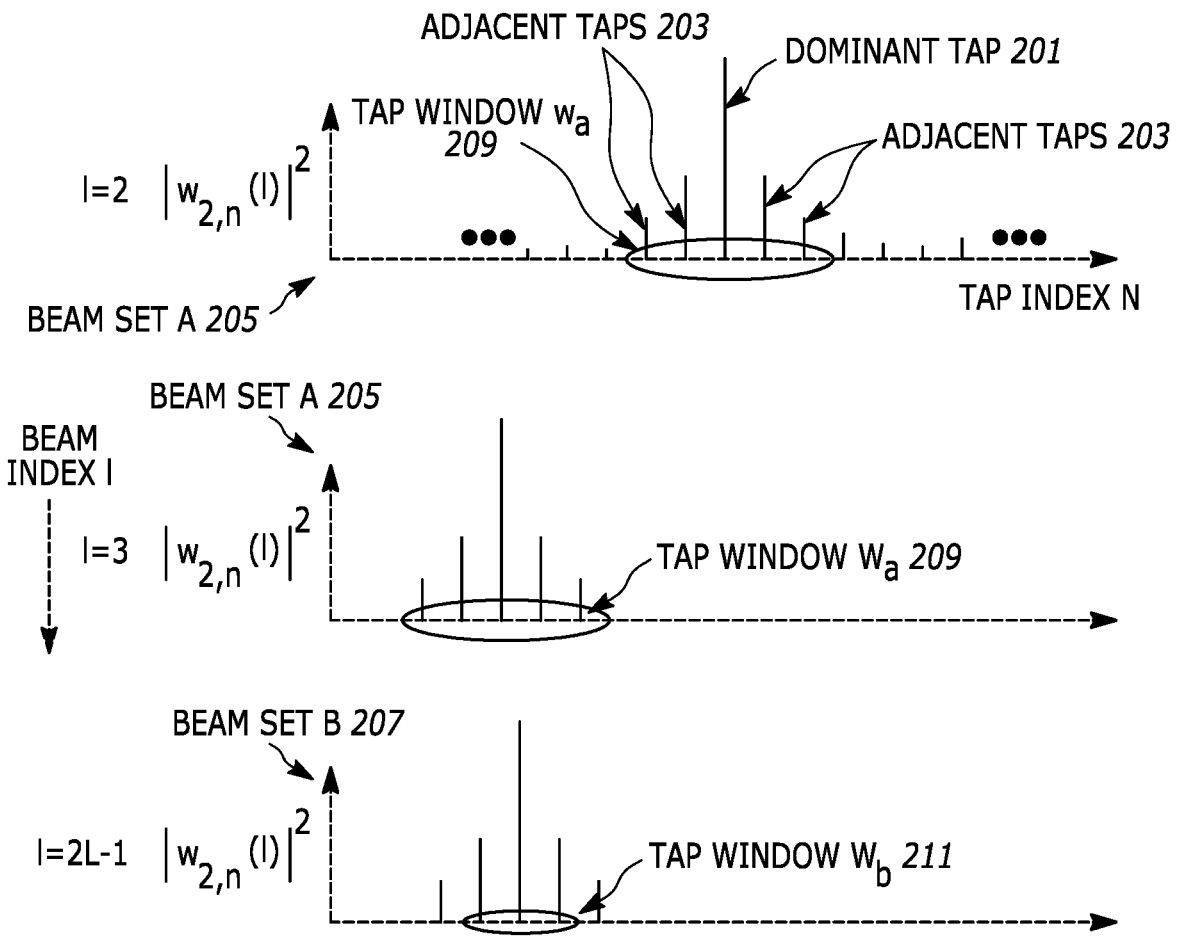
FIG. 2 is a diagram illustrating time domain taps including dominant and adjacent taps along with beam dependent windows.

Referring again to FIG. 2, the set of beams are divided into beam set a 205 and beam set b 207. The number of beam sets could be more than two however. In FIG. 2 the scaling scheme described above is assumed and therefore no weighting vectors are fed back for the first beam. Therefore 2 L–1 beams are shown with beam indexing beginning with beam index 2. Scaling by the dominant beam however is not required in what follows. Each beam set has a corresponding tap window, the tap window for beam set a is denoted as $W_a$ 209 and the tap window for beam set b 211 is denoted as $W_b$. Taps which follow outside the tap window do not have their weighting coefficients reported. The weighting vector reported by the UE for a tap within a tap window is quantized with a quantization scheme that is dependent upon its beam set and whether it is a dominant tap or an adjacent tap. For example, dominant taps of a beam within beam set a are quantized with one quantization scheme. A quantization scheme can consist of quantizing the magnitude and phase separately or quantizing the real and imaginary parts separately. In either case, the quantizing scheme is also characterized by the number of quantization levels used for each part. The number of quantization levels can also be expressed as the number of bits needed to express the index of quantization level in a binary representation. Adjacent taps of beam set a that are within the tap window $W_a$ are quantized with a different quantization scheme than the dominant tap. They may, for example, be quantized with fewer bits of amplitude or phase levels. In addition the reference (or 'full scale') for quantization for adjacent taps can be the quantized dominant path within the window.

Taps belonging to beam set b that are within a window $W_b$ and are the dominant paths can be quantized with a different quantization scheme than either the dominant or adjacent taps in beam set a. Taps belonging to beam set b that are within a window $W_b$ and are adjacent paths can be quantized with a different quantization scheme than either the dominant or adjacent taps in beam set a or the dominant taps in beam set b.

Figure 3:
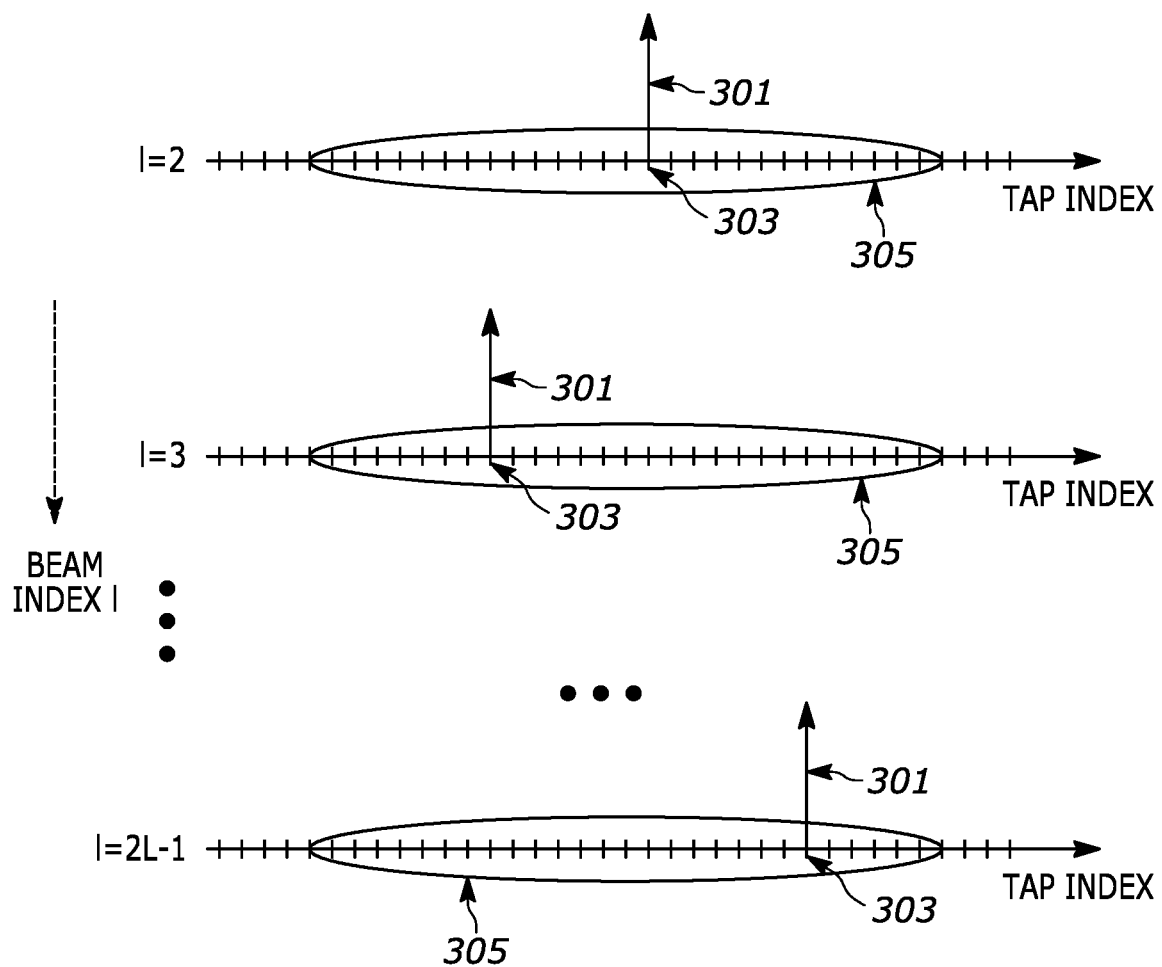
FIG. 3 is a diagram illustrating a range of tap indices from which tap indices are reported.

In addition to the elements of the quantized transformed precoding vectors $\hat{w}_{2,r}(l)$ which are within a tap window and therefore potentially non-zero, the UE may also feed back the dominant tap indices for each beam. If a dominant tap index can be any index of the transformed precoding vector, then the number of bits needed to represent the tap index is $\log_2(\lceil N_{sb} \rceil)$ where $\lceil \ \rceil$ denotes the ceiling function. If the scaling strategy described is employed or for channels with low delay spread, it may be unlikely that dominant taps occur outside a given range. Referring to FIG. 3, the dominant taps 301 for a set of 2 L–1 beams are shown. Indices of dominant taps 303 within an interval of integer indices, called the range R 303, are fed back to the gNB. The range 305 can be signaled by the gNB with control signaling, such as RRC signaling or layer 1 signaling used in NR. The lowest index in the range may be 0 or 1. The largest index in the range can be the largest index of a dominant path which can be fed back by the UE. The number of elements in the range can be the number of different indices that a dominant path index fed back by the UE can take.

An alternative embodiment for reporting the indices of the dominant taps is to feed back a set of delays D that has a number of members that is less than the number of beams, 2 L–1. In addition for each beam an indicator is fed back that indicates which one of the delays in D is the delay of the dominant tap for that beam. For example D may be the set {0,1} and beams 2, 3, 4, 5, 6 may have dominant tap delays of 0 while beam 7 has dominant tap delay 1. In this case four bits are used to send a representation of D and one bit is used for each beam for a total of 4+7=11. This is in contrast to sending a 2 bit representation for every beam which is 14 bits.

Another alternative embodiment for reporting the indices of the dominant taps is to feed back a single delay corresponding to the delay of a dominant tap of one beam or a fixed value. This delay is represented in a fixed number of bits. A second delay is represented as the difference between the second delay and the first delay. This delay is represented in a number of bits less than the first delay. Additional delays are represented as the difference relative to the previous delay. Alternatively, additional delays are represented as the difference relative to the first delay.

For a user equipment, such as remote unit 105, a transceiver can be used to communicate with one or more network functions of a mobile communication network. The transceiver can operate under the control of a processor to transmit messages, data, and other signals and also to receive messages, data, and other signals. For example, the processor may selectively activate the transceiver (or portions thereof) at particular times in order to send and receive messages. To support spatial multiplexing and beamforming, the transceiver may include multiple transmitters and/or multiple receivers.

Figure 4:
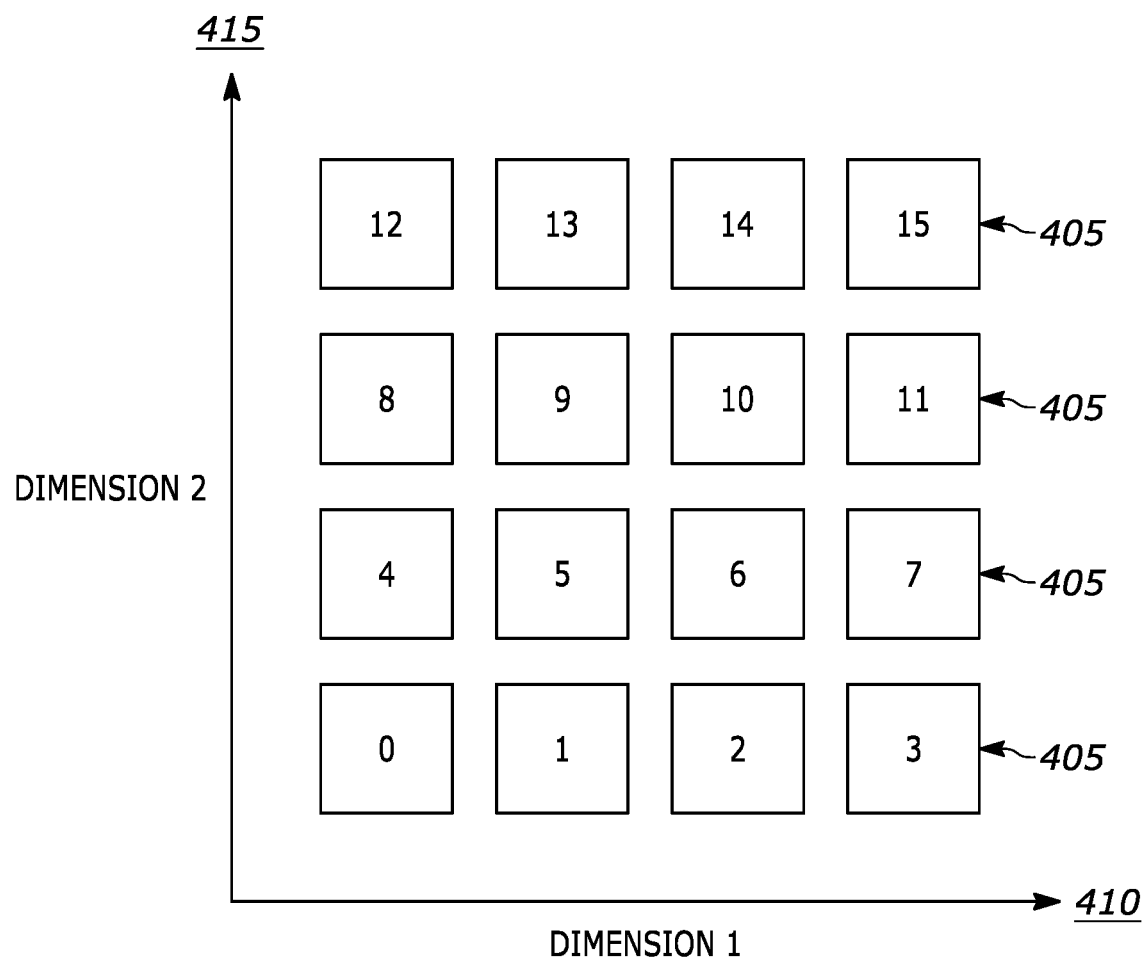
FIG. 4 is a block diagram illustrating one exemplary embodiment of antenna elements.

FIG. 4 depicts an array 400 of antenna elements 405 for efficiently coding a CSI codebook, according to various embodiments of the disclosure. Here, the antenna elements 405 are arranged into a 4×4 grid. As depicted, each antenna elements 405 has an index and the location of each antenna elements may be described using coordinates of a first dimension 410 and a second dimension 415. For example, the antenna elements 405 of index 7 may be described using the coordinates {3,1} and the antenna elements 405 of index 12 may be described using the coordinates {3,0}. Note that the beam index may be identified using a 4-bit value. In some embodiments, each antenna elements 405 is a dual-polarized antenna element comprising two physical elements, each sensitive to orthogonal polarization.

An antenna port may correspond to one or more physical network elements. In certain embodiments, an antenna port corresponds to a set of orthogonally arranged antenna elements, such that the antenna port may produce a beam with a first polarization or a second polarization orthogonal to the first polarization. Thus, a dual-polarized antenna element may correspond to two antenna ports, one for each orthogonal polarization. In various embodiments, preparing a CSI codeword includes identifying a beam index of the main beam of a transmission layer. Here, the beam index may be the index of the corresponding (dual-polarized) antenna element.

Figure 5:
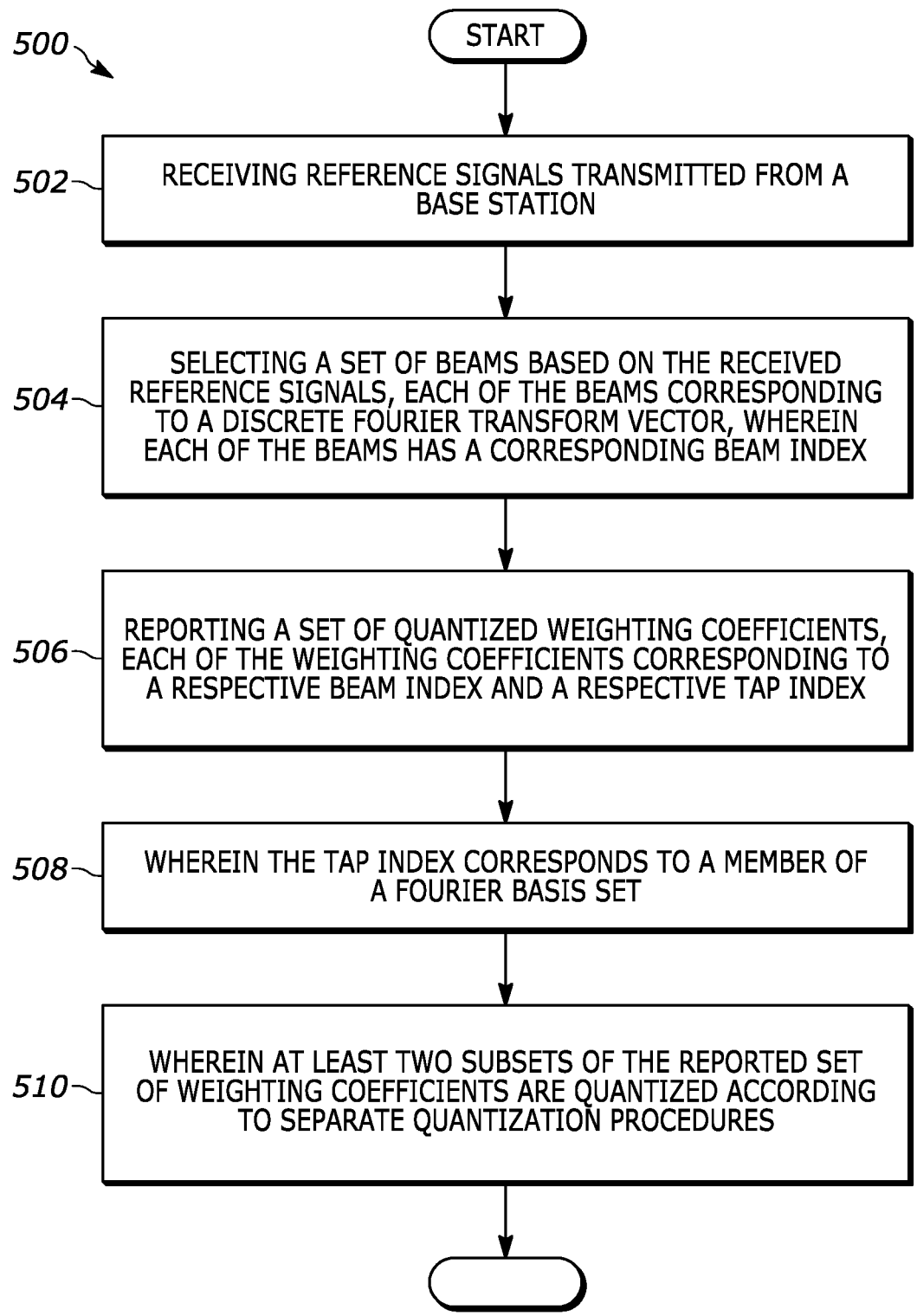
FIG. 5 is a flow diagram in a user equipment for generating a channel state information report.

FIG. 5 illustrates a flow diagram 500 in a user equipment for generating a channel state information report. The method includes receiving 502 reference signals transmitted from a base station. A set of beams are selected 504 based on the received reference signals, each of the beams corresponding to a discrete Fourier transform vector, wherein each of the beams has a corresponding beam index. A set of quantized weighting coefficients are reported 506, each of the weighting coefficients corresponding to a respective beam index and a respective tap index. The tap index corresponds to a member of a Fourier basis set 508. At least two subsets of the reported set of weighting coefficients are quantized according to separate quantization procedures 510.

In some instances, the weighting coefficients belonging to different subsets have distinct corresponding beam index values. In some of these instances, the number of subsets is 2, and wherein the beam index values corresponding to the first subset of weighting coefficients are included in a first half of the ordered beam indices, and the beam index values corresponding to the second subset of weighting coefficients are included in a second half of the ordered beam indices. The discrete Fourier transform vectors of the selected set of beams corresponding to the first and second subsets of weighting coefficients in some instances can be identical.

In others of these instances, the number of subsets is 2, and wherein the number of beam index values corresponding to the first subset of weighting is equal to the number of beam index values corresponding to the second subset of weighting coefficients. The discrete Fourier transform vectors of the selected set of beams corresponding to the first and second subsets of weighting coefficients in some instances can be identical. The quantization procedures in some instances can assign different levels of quantization to different weighting coefficients.

In some instances, the Fourier basis set is one of a discrete Fourier transform or an inverse discrete Fourier transform basis sets.

In some instances, the quantization procedures assign different levels of quantization to different weighting coefficients.

In some instances, one of the weighting coefficients corresponding to a dominant tap index within a subset has a separate quantization procedure than the remaining weighting coefficients in the subset.

Figure 6:
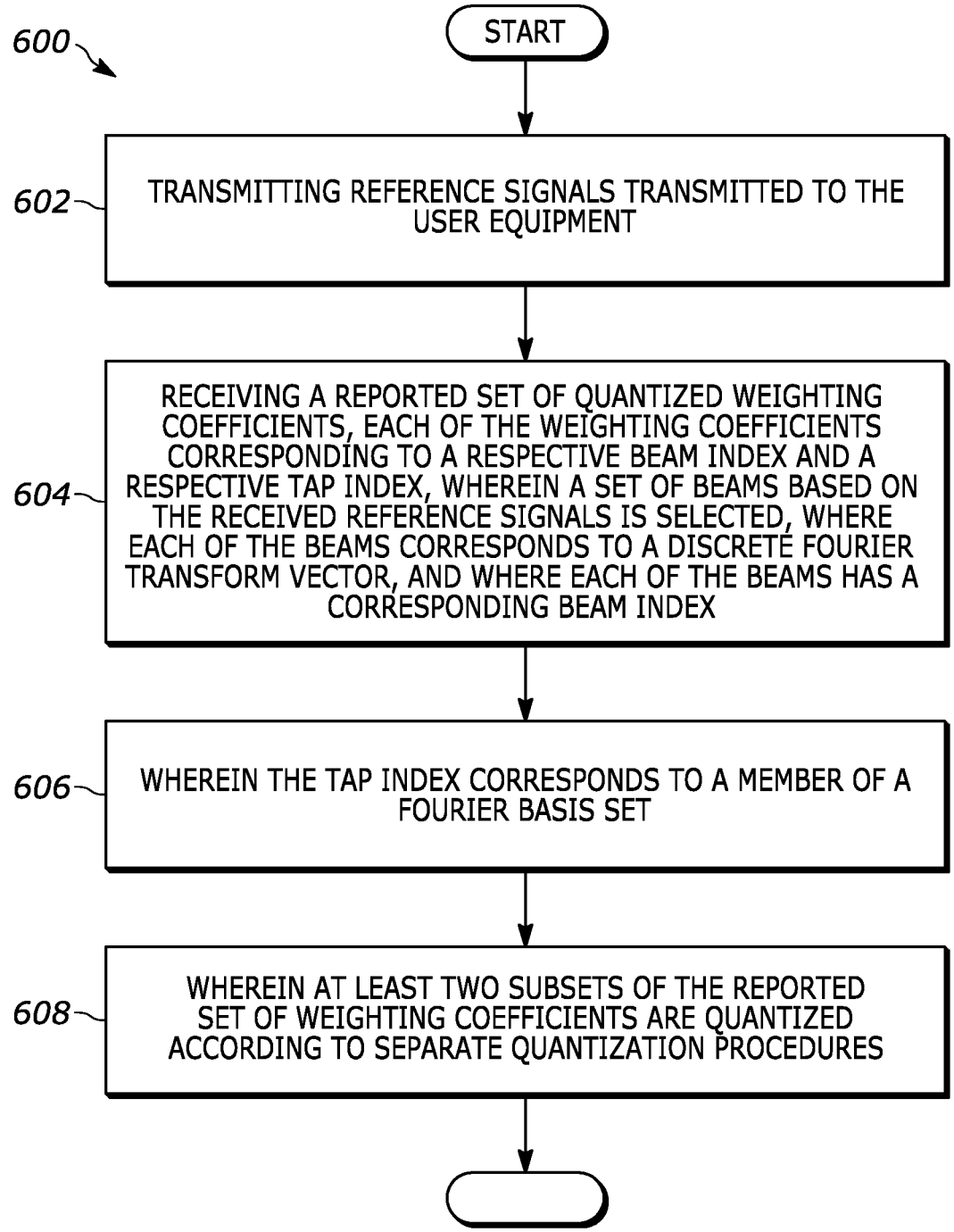
FIG. 6 is a flow diagram in a network entity associated with receiving a channel state information report from the user equipment.

FIG. 6 illustrates a flow diagram 600 in a network entity associated with receiving a channel state information report from the user equipment. The method includes transmitting 602 reference signals transmitted to the user equipment, and receiving 604 a reported set of quantized weighting coefficients. Each of the weighting coefficients corresponds to a respective beam index and a respective tap index. A set of beams based on the received reference signals is selected, where each of the beams corresponds to a discrete Fourier transform vector, and where each of the beams has a corresponding beam index. The tap index corresponds to a member of a Fourier basis set 606. At least two subsets of the reported set of weighting coefficients are quantized according to separate quantization procedures 608.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
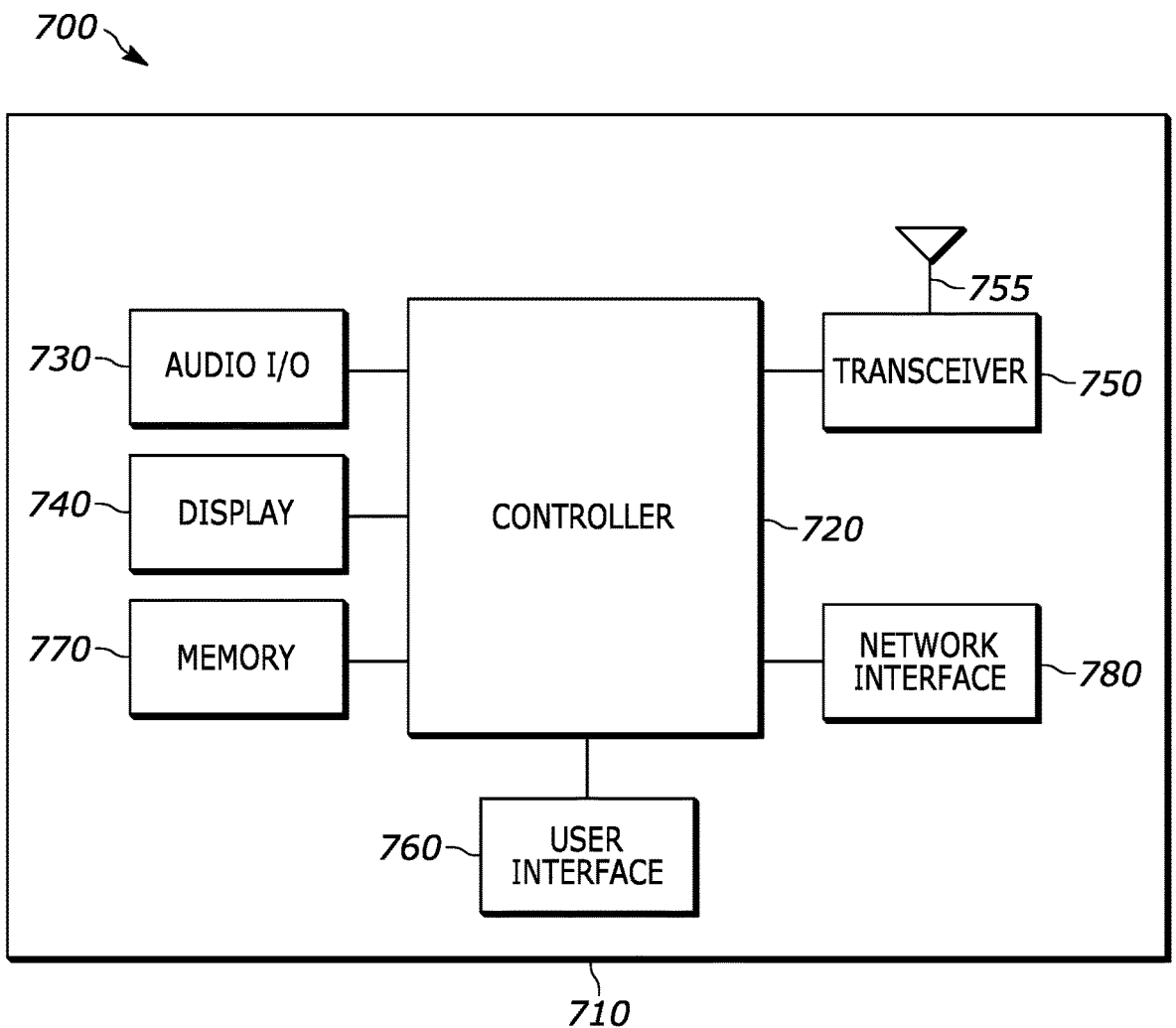
FIG. 7 is an example block diagram of an apparatus according to a possible embodiment.

FIG. 7 illustrates an example block diagram of an apparatus 700, such as the wireless communication device 105, according to a possible embodiment. The apparatus 700 can include a housing 710, a controller 720 within the housing 710, audio input and output circuitry 730 coupled to the controller 720, a display 740 coupled to the controller 720, a transceiver 750 coupled to the controller 720, an antenna 755 coupled to the transceiver 750, a user interface 760 coupled to the controller 720, a memory 770 coupled to the controller 720, and a network interface 780 coupled to the controller 720. The apparatus 700 can perform the methods described in all the embodiments.

The display 740 can be a viewfinder, a liquid crystal display (LCD), a light emitting diode (LED) display, a plasma display, a projection display, a touch screen, or any other device that displays information. The transceiver 750 can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 770 can include a random access memory, a read only memory, an optical memory, a solid state memory, a flash memory, a removable memory, a hard drive, a cache, or any other memory that can be coupled to an apparatus.

The apparatus 700 or the controller 720 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 770 or elsewhere on the apparatus 700. The apparatus 700 or the controller 720 may also use hardware to implement disclosed operations. For example, the controller 720 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A method in a network entity for communicating with a user equipment, the method comprising:
   transmitting reference signals to the user equipment;
   receiving a reported set of quantized weighting coefficients, each of the weighting coefficients corresponding to a respective beam index and a respective tap index, where a set of beams based on the reference signals transmitted to the user equipment is selected, where each of the beams corresponds to a discrete Fourier transform vector, and where each of the beams has a corresponding beam index;
   wherein the tap index corresponds to a member of a Fourier basis set;
   wherein at least two subsets of the reported set of weighting coefficients are quantized according to separate quantization procedures;
   wherein the weighting coefficients belonging to different subsets have distinct corresponding beam index values; and
   wherein the number of subsets is 2, and wherein the beam index values corresponding to the first subset of weighting coefficients are included in a first half of ordered beam indices, and the beam index values corresponding to the second subset of weighting coefficients are included in a second half of the ordered beam indices, where the ordered beam indices include the corresponding beam index of each of the beams from the set of beams that have been organized based upon a respective energy associated with each of the corresponding beam index of each of the beams.

2. The method of claim 1, wherein the discrete Fourier transform vectors of the selected set of beams corresponding to the first and second subsets of weighting coefficients are identical.

3. The method of claim 1, wherein the number of beam index values corresponding to the first subset of weighting coefficients is equal to the number of beam index values corresponding to the second subset of weighting coefficients.

4. The method of claim 3, wherein the discrete Fourier transform vectors of the selected set of beams corresponding to the first and second subsets of weighting coefficients are identical.

5. The method claim 3, wherein the quantization procedures assign different levels of quantization to different weighting coefficients.

6. The method of claim 1, wherein the Fourier basis set is one of a discrete Fourier transform or an inverse discrete Fourier transform basis sets.

7. The method of claim 1, wherein the quantization procedures assign different levels of quantization to different weighting coefficients.

8. The method of claim 1, wherein one of the weighting coefficients corresponding to a dominant tap index within a subset has a separate quantization procedure than the remaining weighting coefficients in the subset.

9. The method of claim 8, wherein the separate quantization procedures include at least a finer quantization having more quantization levels, and a coarser quantization having fewer quantization levels.

10. The method of claim 1, wherein respective inclusion in the first and second subset is dependent upon whether the respective energy associated with each of the corresponding beam index of each of the beams exceeds a predetermined threshold value.

11. The method of claim 1, wherein respective inclusion in the first and second subset is dependent upon whether the respective energy associated with each of the corresponding beam index of each of the beams has a zero coefficient value, or a non-zero coefficient value.

12. A network entity for communicating with a user equipment, the network entity comprising:
    a controller; and
    a transceiver that transmits reference signals to the user equipment, and receives a reported set of quantized weighting coefficients, each of the weighting coefficients corresponding to a respective beam index and a respective tap index, wherein a set of beams based on the reference signals is selected, where each of the beams corresponds to a discrete Fourier transform vector, and where each of the beams has a corresponding beam index;

wherein the tap index corresponds to a member of a Fourier basis set;

wherein at least two subsets of the reported set of weighting coefficients are quantized according to separate quantization procedures;

wherein the weighting coefficients belonging to different subsets have distinct corresponding beam index values; and wherein the number of subsets is 2, and wherein the beam index values corresponding to the first subset of weighting coefficients are included in a first half of ordered beam indices, and the beam index values corresponding to the second subset of weighting coefficients are included in a second half of the ordered beam indices, where the ordered beam indices includes the corresponding beam index of each of the beams from the set of beams that have been organized based upon a respective energy associated with each of the corresponding beam index of each of the beams.

13. The network entity of claim 12, wherein the discrete Fourier transform vectors of the selected set of beams corresponding to the first and second subsets of weighting coefficients are identical.

14. The network entity of claim 12, wherein the number of beam index values corresponding to the first subset of weighting coefficients is equal to the number of beam index values corresponding to the second subset of weighting coefficients.

15. The network entity of claim 14, wherein the discrete Fourier transform vectors of the selected set of beams corresponding to the first and second subsets of weighting coefficients are identical.

16. The network entity of claim 14, wherein the quantization procedures assign different levels of quantization to different weighting coefficients.

17. The network entity of claim 12, wherein the Fourier basis set is one of a discrete Fourier transform or an inverse discrete Fourier transform basis sets.

18. The network entity of claim 12, wherein the quantization procedures assign different levels of quantization to different weighting coefficients.

19. The network entity of claim 12, wherein one of the weighting coefficients corresponding to a dominant tap index within a subset has a separate quantization procedure than the remaining weighting coefficients in the subset.

20. The network entity of claim 19, wherein the separate quantization procedures include at least a finer quantization having more quantization levels, and a coarser quantization having fewer quantization levels.

* * * * *